Aug. 26, 1930.   O. M. NACKER   1,773,745
INTERNAL COMBUSTION ENGINE
Filed June 19, 1929

Inventor
OWEN M. NACKER
By
Attorney

Patented Aug. 26, 1930

1,773,745

UNITED STATES PATENT OFFICE

OWEN M. NACKER, OF PLEASANT RIDGE, MICHIGAN, ASSIGNOR TO PACKARD MOTOR CAR COMPANY, OF DETROIT, MICHIGAN, A CORPORATION OF MICHIGAN

INTERNAL-COMBUSTION ENGINE

Application filed June 19, 1929. Serial No. 372,170.

This invention relates to internal combustion engines, and particularly to means for damping torsional vibration of the crank-shafts of such engines.

It is especially adapted to, and has been described in connection with an engine in which the crank-shaft has more than one crank between adjacent shaft bearings, so that there is a crank-shaft or crank-arm common to two cranks.

It is one of the objects of the invention to provide effective means for damping torsional vibration in engine shafts which shall not materially increase any of the engine dimensions, particularly the over-all length thereof.

Another object of the invention is to provide efficient damping means which may be readily housed within the engine crank case without necessitating changes in the mounting and arrangement of the drive for the engine accessories or other connected elements, and without interference with existing engine parts.

Another object of the invention is to provide a vibration damper which may be mounted on a cheek or arm of the crank-shaft, and which will not disturb the static or dynamic balance of the shaft.

Another object of the invention is to provide a damping device of the character designated in which an inertia member is urged towards a normal or neutral position with respect to the crank-shaft by easily adjustable resilient means.

A further object of the invention is to provide such a vibration damper in which friction members are carried by resilient means which is easily adjustable to vary the damping effect.

Figure 1:
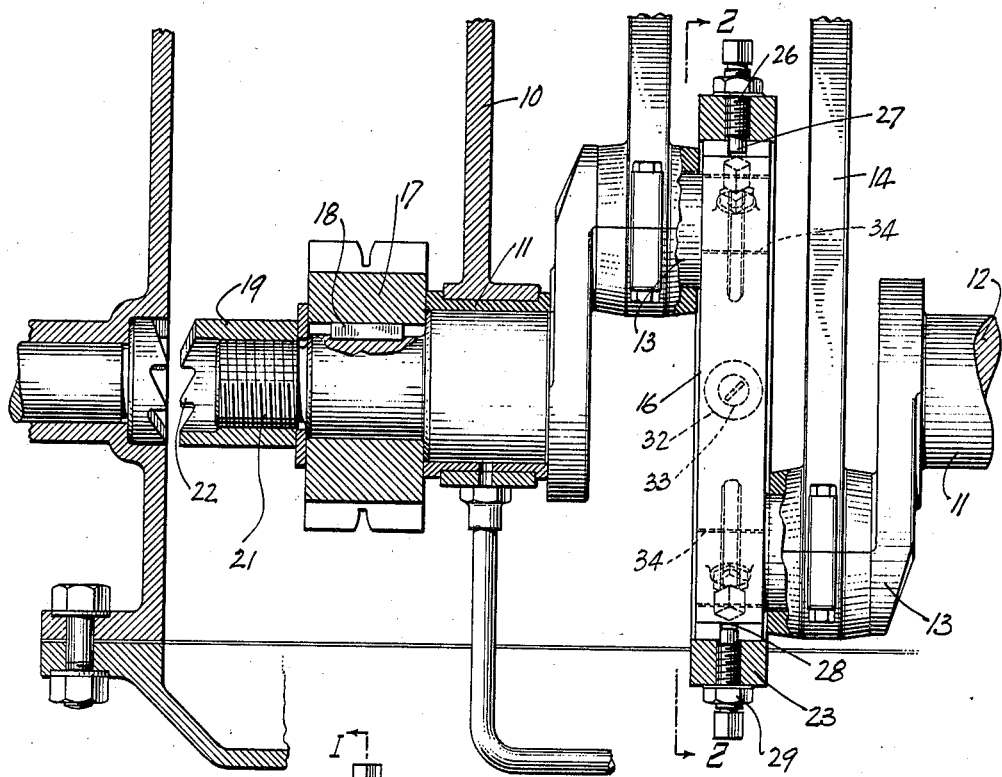
Figure 2:
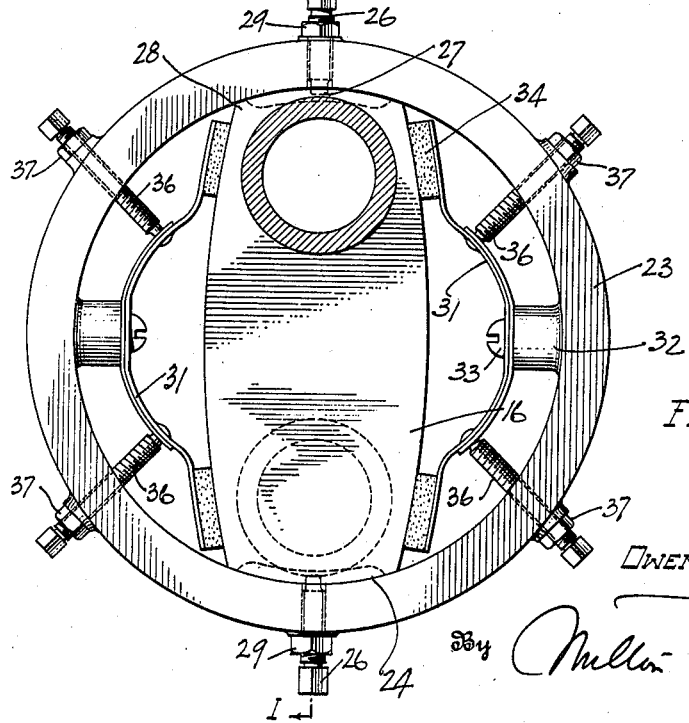

Other objects of the invention will appear from the following description taken in connection with the drawings, which form a part of this specification, and in which:

Figure 1 is a view, partially in side elevation and partially in longitudinal vertical section through part of an internal combustion engine embodying the invention, and Figure 2 is an end view of the double crank-arm showing the invention, partly in transverse section, substantially on the line 2—2 of Figure 1.

Referring to the drawings, 10 represents a part of the crank case of an internal combustion engine, being one of a number of transverse webs therein. These webs support suitable aligned bearings 11 for an engine crank-shaft 12, the latter having the usual integral cranks 13, each of which is connected by a connecting rod 14 with a piston mounted in one of the engine cylinders, the piston and cylinder not being shown in the drawing but being of usual construction.

In the embodiment of the invention shown, the crank-shaft 12 is of that type in which the cranks 13 are formed in pairs between adjacent bearings 11, each pair having a common crank arm or cheek 16, but it is to be understood that the invention is not limited to shafts of this type, but may be applied to crank-shafts having any of the well-known arrangements of cranks and bearings.

The forward end of the crank-shaft 12 may be reduced in diameter and provided with a gear or sprocket 17, rotatably secured thereto as by a key 18, through which the engine cam-shaft and other engine accessories may be driven by an intermeshing gear or a sprocket chain (not shown). The gear 17 may be conveniently retained in axial position by a nut 19 screwed to the reduced end 21 of the shaft, and provided with teeth 22, which may be engaged with teeth on a suitable starter shaft, as shown.

The damping means of the invention is illustrated as mounted near the forward end of the crank-shaft 12, on the crank arm thereof. It is in the form of a weight or inertia member 23, preferably annular in shape and conforming closely to the circle of rotation of the crank-arm. This inertia member 23 is movably mounted on the crank-arm 16 in the plane thereof, being preferably supported on the ends of the arm, which are arcuable to provide bearings for this purpose as shown at 24. It is retained against axial movement from the plane of the arm in any convenient manner, such as by a tongue and groove connection, which as shown comprises radially disposed set screws 26 threaded into the inertia member on diametrically opposite sides thereof, and having inwardly projecting ends or tongues 27 disposed in circumferential grooves 28 in the ends of the crank arm 16. These screws 26 may be retained in position by suitable lock nuts 29. Relative movement between the inertia member 23 and the crankshaft is thus restricted to a rotation on the crank-arm 16, and in the plane thereof, and such movement may be limited by the ends of the grooves 28, which act as stops for the tongues 27.

To urge this inertia member toward its neutral position with respect to the crank-arm, and to resist rotary movement away from this position, suitable resilient means is provided, which in the form illustrated comprises an oppositely disposed pair of bow springs 31. These springs, which may be laminated if desired, are secured to the inertia member 23 in any convenient manner, as by abutments 32 in the form of lugs which are integral with the inertia member and are preferably disposed halfway between the set screws 26 thereon. The springs 31 are secured at their central portions to the lugs 32 as by screws 33, and the ends of each of these springs extend in opposite direction from the abutment 32 toward the opposite ends of the crank-arm 16.

The ends of the springs 31 engage the crank-arm through friction members or shoes 34, which may be of any suitable friction material, and which are secured to the ends of the spring. These have a rubbing contact with the sides or edges of the crank-arm 16 near the opposite ends of this arm, being urged into frictional engagement with the arm through the resilient springs 31. Since these springs are oppositely disposed, and of substantially equal strength, it will be evident that any movement of the inertia member relative to the crank-arm takes place against the pressure of these springs which tend to return it to neutral position after any deflection therefrom. Such movement is also resisted by the rubbing friction of the members 34, which friction constitutes the principal damping friction of the device.

The present invention also provides means for varying the damping effect by readily adjusting the amount of damping friction provided. In the form shown, this adjusting means consists of convergent screws 36 which are threaded through the annular inertia member 23 on either side of each of the abutments 32, and which bear at their inner ends against the spring members 31. It will be evident that by proper adjustment of these screws, the effective length of the springs 31, and consequently their stiffness, may be adjusted in such a way as to increase or decrease the pressure with which their ends urge the members 34 into engagement with the edges of the crank-arm. These screws 36 are preferably provided with lock nuts 37 by which they may be secured in adjusted position.

The operation of this device will be readily understood from the above description. During normal rotation of the crank-shaft 12, the inertia member 23 rotates therewith without movement relative to the crank-cheek 16. As the mass of this member is symmetrically disposed with respect to the axis of rotation, it does not disturb the balance of the shaft in any way. Upon the inception of a torsional vibration, however, an alternating motion of high frequency is superposed on the shaft, which the member 23 is unable to follow because of its inertia. This causes the member 23 to oscillate upon the bearings 27 with respect to the crank-arm, which movement is opposed by the springs 31, which are deformed alternately on opposite sides. It is also opposed by the considerable friction between the members 31 and the crank-arm 16. This friction transforms part of the energy of vibration into heat in which form it is dissipated from the system by radiation. Such dissipation of vibratory energy is sufficient to prevent the resonant growth of the vibration and the disturbance is accordingly damped.

It will be seen that this invention provides a simple and effective vibration damper, which by reason of its mounting on the engine crank-shaft, and practically within the circle of rotation thereof, does not substantially increase any of the dimensions of the engine. Being located on a crank-cheek behind the first crank-shaft bearing 11, it does not necessitate any change in the arrangement of the driving pinion 17 at the front end of the engine.

Moreover, this invention provides a damping device in which the damping effect may be materially altered by a simple adjustment. By screwing in the adjusting screws 36, the stiffness, and the effective pressure of the springs 31 will be greatly increased, thus not only varying the natural period of the damping mechanism, but at the same time greatly increasing the pressure exerted by the friction shoes 34 on the crank-cheek 16. Such increase in pressure of the shoes 34 obviously increases the friction developed at this point, and damping effect of the device is increased accordingly.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. In a vibration damper for crank-shafts having a crank-arm, an annular inertia member movably mounted on said crank-arm, springs carried by said inertia member, and friction devices carried by the springs and engaging said crank arm to resist movement of the inertia member relative thereto.

2. In a vibration damper for crank-shafts having a crank arm, an annular inertia member mounted on said arm to oscillate in the plane thereof, a bowed spring secured at its central portion to said inertia member, and friction members carried by the ends of the spring to yieldingly engage the crank arm.

3. In a vibration damper for crank-shafts having a crank arm, an inertia member mounted for rotation in the plane of the crank arm and secured at the ends of said arm against axial displacement thereon, and opposed spring devices carried by said inertia member having a frictional engagement with said arm.

4. A vibration damping device for crank-shafts having crank arms, comprising an annular inertia member surrounding said crank arm and having a bearing on the ends thereof, spring abutments on the inertia member, springs carried by said abutments, and friction members carried by said springs and urged into resilient frictional engagement with the sides of said crank arm.

5. In a vibration damper for crank-shafts having a crank arm, bearings at the ends of said arm, and an annular inertia member journaled on said bearings to rotate about the shaft axis in the plane of said arm, and friction members carried by the inertia member and engaging said arm to resist movement of the inertia member.

6. In a vibration damper for crank-shafts, a crank-arm having curved end portions forming bearings, an annular inertia member journaled on said bearings to rotate in the plane of the arm, springs carried by said ineratia member, and friction members carried by said springs in frictional engagement with said arm to resist said movement.

7. In a vibration damper for crank-shafts, a crank arm having curved end portions forming bearings, an annular inertia member journaled on said bearings to rotate in the plane of the arm, bow springs secured to said inertia member and having oppositely disposed ends extending toward the ends of the arm, and friction shoes on said spring ends resiliently urged thereby into engagement with the arm.

8. In a vibration damper for crank-shafts having a crank arm, an inertia member surrounding said arm in the plane thereof and journaled on the ends of said arm, opposed springs carried by said inertia member on each side of the arm, friction devices carried by the springs and urged thereby into frictional engagement with said arm, and means carried by said inertia member to adjustably vary the pressure of said spring.

9. In a vibration damper for crank-shafts having a crank-arm, an inertia member surrounding said arm in the plane thereof and journaled on the ends of said arm, opposed springs carried by said inertia member on each side of the arm friction devices carried by the springs and urged thereby into frictional engagement with said arm, and adjusting screws in said inertia member engaging said springs to adjustably vary the pressure thereof.

10. In a vibration damper for crank-shafts having a crank-arm, an inertia member surrounding said arm and journaled on the ends thereof to rotate in the plane of the arm, circumferential grooves in the ends of the arm, tongues carried by the inertia member engaging said grooves to retain the inertia member in the plane of the arm, and means to frictionally and resiliently resist movement of the inertia member relative to the arm.

11. A vibration damper for crank-shafts having a crank-arm, comprising an inertia member rotatably mounted on the ends of said arm in the plane thereof, and opposed leaf springs carried by said inertia member having a frictional connection at their ends to said arm.

12. A vibration damper for crank-shafts having a crank-arm, comprising an inertia member rotatably mounted on the ends of said arm in the plane thereof, and a pair of leaf springs secured at their middle portions to the inertia member on opposite sides of said crank-arm and having a rubbing frictional connection at their ends with said arm.

In testimony whereof I affix my signature.

OWEN M. NACKER.